UNITED STATES PATENT OFFICE.

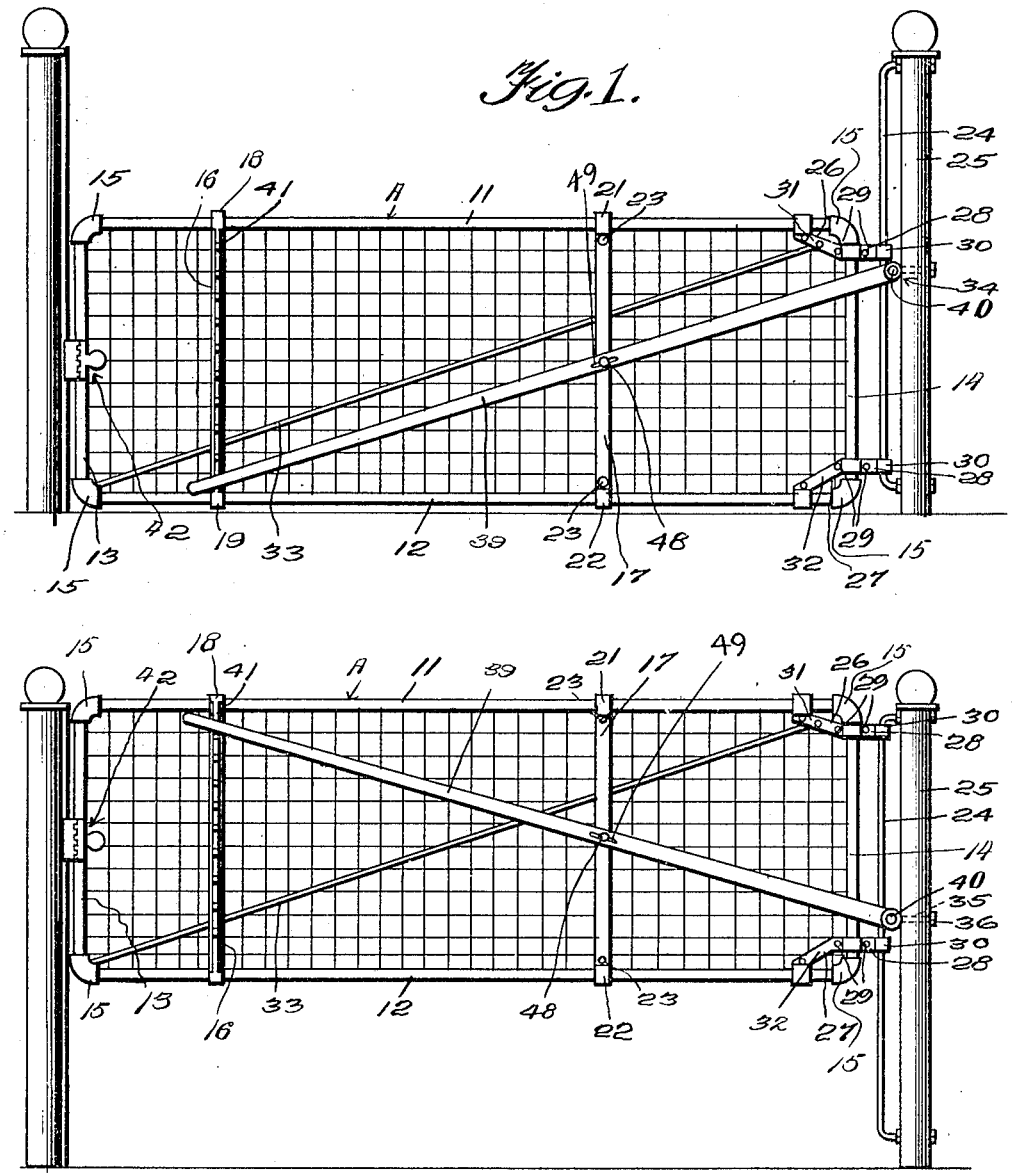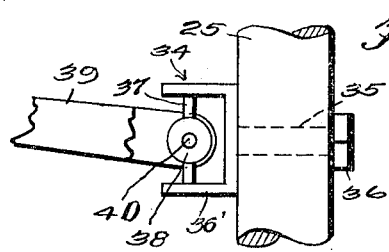

BENJAMIN P. CRITCHLOW, OF OGDEN, UTAH.

GATE.

1,292,437.  Specification of Letters Patent.  Patented Jan. 28, 1919.

Application filed November 12, 1917. Serial No. 201,607.

*To all whom it may concern:*

Be it known that I, BENJAMIN P. CRITCHLOW, a citizen of the United States, and resident of Ogden, in the county of Salt Lake and State of Utah, having invented new and useful Improvements in Gates, of which the following is a specification.

My invention relates to improvements in gates, and has particular reference to that class of gates capable of having imparted to them a vertical and a translatory movement.

An important object of the invention is to provide in a gate of the above mentioned character a means whereby the same may be easily elevated to an appreciable distance above the ground and locked in an elevated position.

A further object of the invention is to provide in a gate of the above mentioned character a means whereby the same may be easily elevated to an appreciable distance above the ground and at the same time allowing the gate to remain locked against translatory movement.

A further object of the invention is to provide a gate of the above mentioned character which may be easily elevated to an appreciable distance above the ground, and capable of having imparted to the same a translatory movement while in an elevated position.

A further object of the invention is to provide a gate of the above mentioned character, which is simple in construction, inexpensive to manufacture, strong, durable, and reliable in operation.

Other objects and advantages of the invention will be apparent during the course of the following description.

In the accompanying drawings forming a part of this specification and in which like numerals are employed to designate like parts throughout the same, Figure 1 is a side elevation of a gate embodying my invention, Fig. 2 is a similar view showing the gate in an elevated position, Fig. 3 is a detail view of a universal joint.

In the drawings, wherein for the purpose of illustration is shown a preferred form of my invention A designates a gate comprising a frame which is formed preferably of metallic tubes, which frame consists of side members 11 and 12, end members 13 and 14, the side members 11 and 12 being secured to the end members 13 and 14 by means of couplings or elbows 15. A plurality of uprights indicated by the numerals 16 and 17 are disposed between the side members 11 and 12. The upright 16 is provided at its upper end with a collar 18 and at its lower end with a collar 19, the collars being fixedly secured to the side members 11 and 12. The upright 17 is provided at its upper end with a collar 21 and at its lower end with a collar 22, which collars are held in position by means of bolts 23 passed through the collars 21 and 22 and the upright 17.

The gate as a whole is hingedly connected to an elongated rod 24 secured to the post 25. These hinges are designated as a whole by the numerals 26 and 27 and are identical in structure, each comprising a horizontally extending member 28 secured to the end member 14 by means of bolts 29, the end 30 of said hinge being rotatably mounted upon the elongated rod 24 and adapted to slide vertically thereupon. The hinge 26 is provided with an angularly disposed bar 31, one end of which is secured to the member 28, the other end being secured to the side member 11. The hinge 27 is provided with an angularly disposed bar 32 similar to that indicated by the numeral 31, one end being secured to the member 28 while the other end is secured to the side member 12. These bars 31 and 32 are designed to relieve the hinges 26 and 27 from any undue strain and brace the gate to prevent the free end thereof from sagging due to any excessive strain exerted thereupon. To further brace the gate against any undue strain there is provided a brace rod 33 which connects the angularly disposed bar 31 with the lower end of the end member 13.

The post 25 approximately intermediate its ends is provided with a universal joint designated as a whole by the numeral 34 and comprising a stem 35 passed through the post 25, which stem is held therein by means of a nut 36. The other end of the stem 35 is provided with a U-shaped member 36' having rotatably mounted therein a shaft 37 provided intermediate its ends with an enlarged portion 38.

To the upright 17 a lever 39 is slidably connected by means of a pin 48 passed through an elongated slot 49. The lever 39 is pivotally connected to the enlarged portion 38 by means of a pin 40 passed therethrough. A rack 41 is disposed upon the upright 16 and serves to lock the free end of the lever 39 in position when the gate is raised to an elevated position as shown in Fig. 2. A latch designated as a whole by the numeral 42 is secured to the end member 13 and serves to lock the gate against translatory movement.

In use, the operation of the gate is as follows: Assuming that the gate is in a closed position and locked against translatory movement and it is desired to elevate the same to the position shown in Fig. 2 whereby small animals may be permitted to pass under the same without necessitating the opening of the gate by translatory movement; the free end of the lever 39 is moved upwardly whereupon the gate as a whole is moved to the position shown in Fig. 2. When the gate is moved to a desired elevation the free end of the lever 39 is moved into engagement with the rack 41 and is locked to retain the gate in the desired elevated position.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States, is:

In combination with a post having an elongated rod vertically secured thereto, of a gate comprising a frame having end and side members, a pair of vertically disposed members connected to the side members, a plurality of hinges, each of said hinges being fixedly connected with a side and end member of said frame and slidably connected with said elongated rod, a universal joint secured to said post intermediate the ends of said rod, a lever connected to said universal joint for elevating the gate, said lever being provided with an elongated slot, a pin passed through said slot to connect said lever with one of said vertically disposed members, a rack secured to the other of said vertically disposed members, said rack being arranged to engage the free end of the lever to lock the gate in an elevated position, said lever serving as a means for preventing the gate from sagging when the same is locked in an elevated position.

BENJAMIN P. CRITCHLOW.

Copies of this patent may be obtained for five cents each, by addressing the "Commissioner of Patents, Washington, D. C."